United States Patent [19]
Chang

[11] Patent Number: 5,860,429
[45] Date of Patent: Jan. 19, 1999

[54] DOUBLE TOP ORNAMENTAL FINGERNAIL ACCESSORY

[75] Inventor: Sung Yong Chang, Roslyn Heights, N.Y.

[73] Assignee: KMC Exim Corporation, New York, N.Y.

[21] Appl. No.: 27,006

[22] Filed: Feb. 20, 1998

[51] Int. Cl.$^6$ .................................................. A45D 31/00
[52] U.S. Cl. ............................................................... 132/73
[58] Field of Search ................................ 132/73, 285, 200

[56] References Cited

U.S. PATENT DOCUMENTS

| | | |
|---|---|---|
| 1,942,332 | 1/1934 | Hamberg . |
| 2,633,139 | 3/1953 | Pettey .................................. 132/73 |
| 2,746,460 | 5/1956 | Jellinek . |
| 4,346,720 | 8/1982 | Hokama . |
| 4,407,310 | 10/1983 | Jadow . |
| 4,408,622 | 10/1983 | Meyerhoefer et al. . |
| 4,554,935 | 11/1985 | Hokama . |
| 4,671,305 | 6/1987 | Mann . |
| 4,751,935 | 6/1988 | Mast et al. . |
| 4,805,645 | 2/1989 | Schiff et al. ........................... 132/73 |
| 4,898,192 | 2/1990 | Cohen .................................. 132/73 |
| 4,920,991 | 5/1990 | Shibahasi et al. . |
| 4,974,610 | 12/1990 | Orsini . |
| 5,036,589 | 8/1991 | Heinrich ............................... 132/73 |
| 5,070,892 | 12/1991 | Trematerra ............................ 132/73 |
| 5,127,414 | 7/1992 | Mast et al. ........................... 132/73 |
| 5,450,864 | 9/1995 | LaJoie et al. . |
| 5,513,664 | 5/1996 | Krupsky . |
| 5,676,165 | 10/1997 | Bannett . |
| 5,699,813 | 12/1997 | Carroll . |

FOREIGN PATENT DOCUMENTS

| | | | |
|---|---|---|---|
| 709286 | 5/1954 | United Kingdom ..................... | 132/73 |

*Primary Examiner*—Todd E. Manahan
*Attorney, Agent, or Firm*—Hoffman & Baron, LLP

[57] ABSTRACT

An ornamental accessory for a fingernail which includes an elongated overlay having a top surface and a bottom surface and first and second ends, the first end having a shape and size approximating the shape and size of at least the end of a fingernail. The base portion is fixed to, and substantially coextensive with, at least the second end of the overlay. In preferred embodiments, the overlay is transparent or translucent while the base is translucent or opaque, and the base also forms an abutment for use in fitting the accessory to the end of the nail of the user. Furthermore, the present ornamental accessory is preferably an artificial fingernail tip, and most preferably a French tip.

18 Claims, 6 Drawing Sheets

DOUBLE TOP ORNAMENTAL FINGERNAIL ACCESSORY

BACKGROUND OF THE INVENTION

The present invention relates to the art of ornamental accessories for fingernails, and, in particular, to a new structure for, and, consequently, new ornamentation for nail coverings and especially, for fingernail tips.

It has been known in the art of adorning the hands to provide ornamental fingernail accessories made from thin, molded plastic members manufactured generally in the shape of a fingernail. Fingernail tips, which are formed to provide an extension of the wearer's fingernails, are especially attractive accessories.

For example, French tip fingernail accessories extend the end of the natural nail and provide a color variation between the natural nail and the tip. French tips create an attractive image by exaggerating the change of color or hue as the nail extends beyond the tip of the finger.

However, a serious flaw in existing French tip technology and art results from the requirement for securing artificial French tips to existing natural nails. Since a substantial overlap of the artificial tip over the nail end is necessary, the different colored tip is made to extend rearwardly to cover the nail base. This rearward extension reduces the nail bed, i.e., the portion of the nail which shows the flesh tone of the wearer.

As shown in FIGS. 1a and 1b herein, the French tip 50 is typically opaque and white in color to ensure a sharp and distinct border between the nail bed 51 and the French tip. This border can be referred to as the "smile line" 52. The tip is secured over the end of a natural nail by an adhesive. A substantial portion of the natural nail end 53 must be covered by the tip to ensure adequate adhesion. As a result, the natural nail bed is reduced. Thus, French tip art and technology is seriously flawed because of the inability to permit display of the maximum nail bed.

Furthermore, for cosmetic appearance, the tip must be shaped by a nail file 54 to eliminate the "step" 55 caused by the thickness of the artificial tip. As shown in FIG. 1c, filing current state-of-the art French tips causes distortion of the sharp "smile line" thus eliminating the desired cosmetic enhancement created by applying a French tip.

Fingernail manufacturers have provided a variety of combinations of materials, arrangements, and colors in fingernail accessories but no one has been able to eliminate the above described shortcomings. Indeed, patents have been issued covering the different combinations.

For example U.S. Pat. No. 5,699,813 to Carroll discloses a full cover artificial fingernail molded with an inlay on its top surface. The overall product is colored to simulate the style of a French fingernail, having lighter colored cuticle and tip end portions and a darker colored central portion (which is usually provided by the inlay). The base and inlay portion are mechanically bound to each other by use of mechanical locks at either end of the inlay and undercut areas at the edges of the inlay which wrap around opposite sides of the base.

U.S. Pat. No. 4,751,935 to Mast, et al. discloses an artificial fingernail or tip of polymer plastic containing a light defusing means located only within the front distal portion, the light defusing means being a plurality of minute depressions within and throughout at least the upper surface of the polymer strip. This provides a textured roughened surface to obtain a natural appearing contrast between the front or distal portion and the proximal (or cuticle) portion of a nail.

In U.S. Pat. No. 4,407,310 to Jadow an artificial fingernail tip is disclosed which includes a plastic member which is adhered about 1/16 to 1/8 inch from the tip of the outwardly extending edge of the natural nail. Granular material such as glass beads is then adhesively bonded to the upper face of the member to form a textured surface. The textured surface of the tip thus contrasts with the color of the natural nail.

U.S. Pat. No. 4,974,610 to Orsini discloses a method of making a set of artificial fingernails wherein a single scene extends across a set of ten artificial fingernails. The image is photographically imprinted on a semi-rigid layer of film and a layer of transparent plastic film is laminated over the layer of photographic film. The individual artificial nails are punched out of the layer of photographic film, and each is contoured by means of a heat press so that each nail has a compound curve wherein a proximal portion has a general cylindrical curvature while a distal portion has a generally spherical curvature.

In U.S. Pat. No. 4,920,991 to Shebahachi, et al. a thermochromic artificial nail is disclosed which includes a thermochromic material changeable in visible external color in response to a change in temperature. The thermochromic material has a thickness of at least one $\mu$m.

U.S. Pat. No. 2,746,460 to Jellinak discloses a fingernail cover having a thin elastic patch preformed in a shape similar to but longer than a human nail. The patch has an opaque reflecting layer having an adhesive surface, and a transparent color layer superposed on the opposing surface of the opaque layer. A third transparent layer can be on the second layer in order to protect it.

U.S. Pat. No. 2,633,139 to Pettey discloses a fingernail cover which includes a thin transparent film undercoated with a colored solvent solution of the same material.

Each of the references set forth above include different structures and combinations to provide ornamental fingernail accessories in the way of coverings. However, each of the references either discloses a rather complicated configuration or is somewhat lacking in the ability to provide a fingernail ornamentation which is cosmetically appealing and easy to apply. Accordingly, it is an object of the present invention, among other objects, to provide a versatile technology for producing attractive ornamental fingernail accessories, particularly French tip fingernail accessories, in a commercially efficient manner.

SUMMARY OF THE INVENTION

The present invention is an ornamental accessory for a fingernail and a method of making same. The accessory of the present invention is a double top covering having an elongated overlay with a top surface and a bottom surface and a first end proximal the wearers nail and/or cuticle and a second end which is distal to the wearer. The accessory also includes a base which is fixed to and substantially coextensive with at least the second end of the overlay.

Preferably, the accessory is a fingernail tip having a first end (or proximal end) in the shape and size approximating the shape and size of at least the end of the fingernail of the wearer. The second end of the elongated overlay forms the tip of the fingernail, and in a preferred embodiment is the larger portion of the accessory in that it is the extension end of a fingernail tip.

In a second embodiment, the accessory is a fingernail cover having a first end which continues and approximates the shape and size of the entire fingernail of the wearer. The second end, forming the tip of the fingernail, is thus an extension of the nail cover.

The base can be fixed to the bottom surface of the overlay. In a preferred embodiment, the overlay is fused together with the base by being cast as a molten plastic there against. The base basically covers the entire second end of the elongated overlay and is coextensive therewith so as to provide the cosmetic technician with the ability to create a desired look. When the ornamental accessory is a fingernail tip, the base covers a majority of the bottom surface of the overlay. When the accessory is a fingernail cover, the base is coextensive with a significantly lesser portion of the bottom surface than in the case of a fingernail tip.

In either event, the overlay can be transparent or translucent while the base can be translucent or opaque such that the base is clearly visible through the top surface of the overlay. In a preferred embodiment, the overlay is transparent and the base is opaque and white in color. Combinations of the possibilities can be used to create the desired effect.

Moreover, the base can also be used to form an abutment on the bottom surface of the overlay to facilitate fitting the accessory to a wearer. In applying the accessory, the abutment is simply drawn into contact with the end of the nail of the wearer.

The accessory is preferably made from a mixture of acrylonitrile-butadiene-styrene (ABS) plastic and a polycarbonate with a greater amount of ABS plastic than the polycarbonate. Since both the overlay and the base are formed from molded plastic, additives such as sparkles, dyes, and different colored plastics, as well as inlaid decorative designs, can be used to create the desired effect.

The method of making the fingernails accessory of the present invention includes a two step molding process. The first step of the process is provided by directing molten material, such as plastic material, into a two part mold having a cavity in the form of either the overlay or the base. The overlay or the base, whichever is molded first, is allowed to cure sufficient enough to permit contact with another molten plastic without disrupting the molded elements integrity. One part of the mold is then removed and replaced with a finishing mold part. The first element molded forms a part of the finishing mold which forms a subsequent cavity for molding the second part. Thus, when the first element to be formed is the base, the base member is then included as a part of the mold forming the cavity for the overlay. When the first element formed is the overlay, the overlay then becomes part of the mold forming the cavity for the base portion. A second injection of molten plastic is then made whereby the two elements are fused together to form the double top ornamental accessory.

One of the primary benefits of the present invention is the ability to provide an artificial fingernail tip, e.g. a French tip, which maximizes display of the nail bed and, thus, the natural flesh tone of the wearer. Concomitantly, the tip can be shaped by filing without destroying the sharp border between the nail bed and the tip, referred to in the art as the "smile line". Combinations of plastics and additives, colors, hues, etc. can be readily incorporated into the different portions of the accessory as described above.

For better understanding of the present invention, reference is made to the following description, taking in conjunction with the accompanying drawings, and its scope will be pointed out in the appended claims.

DETAILED DESCRIPTION OF THE PREFERRED EMBODIMENTS

Figure 1A:
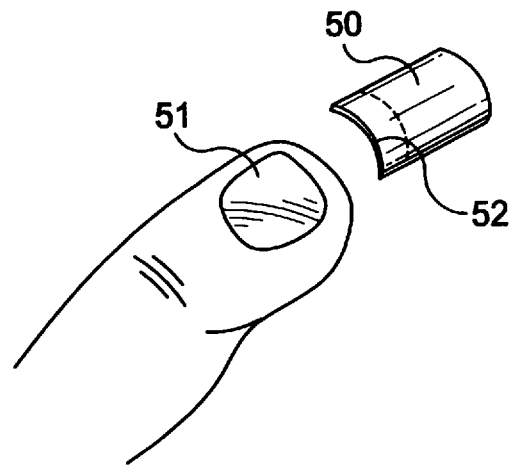
FIGS. 1a, 1b and 1c are perspective views of a typical artificial fingernail tip of the prior art as applied to a natural fingernail.
Figure 1B:
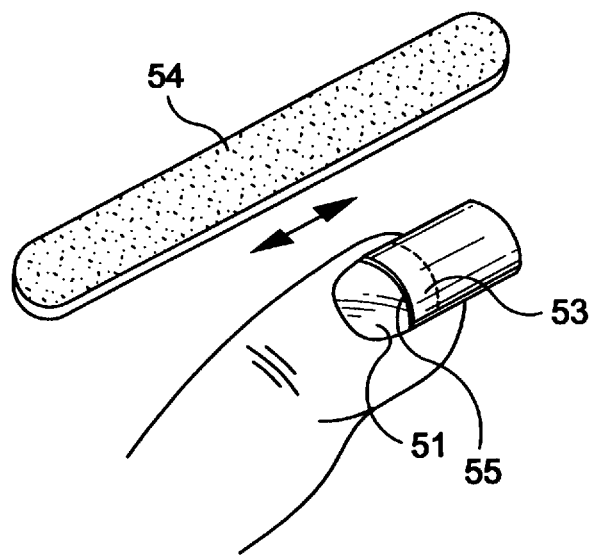
Figure 1C:
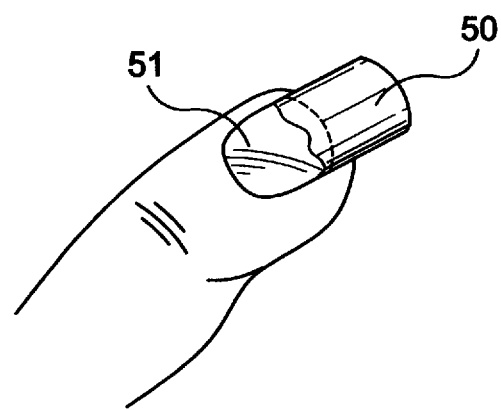

Referring to the drawings, preferred embodiments of an ornamental accessory of the present invention are shown. Preferably, the accessory is a fingernail tip 10 which is applied to the end of a natural fingernail and provides an artificial extension to the nail. The most preferred form of the invention is an extension referred to as a French tip. The accessory includes an elongated overlay 11, and a base 12 fused to the overlay.

Figure 2:
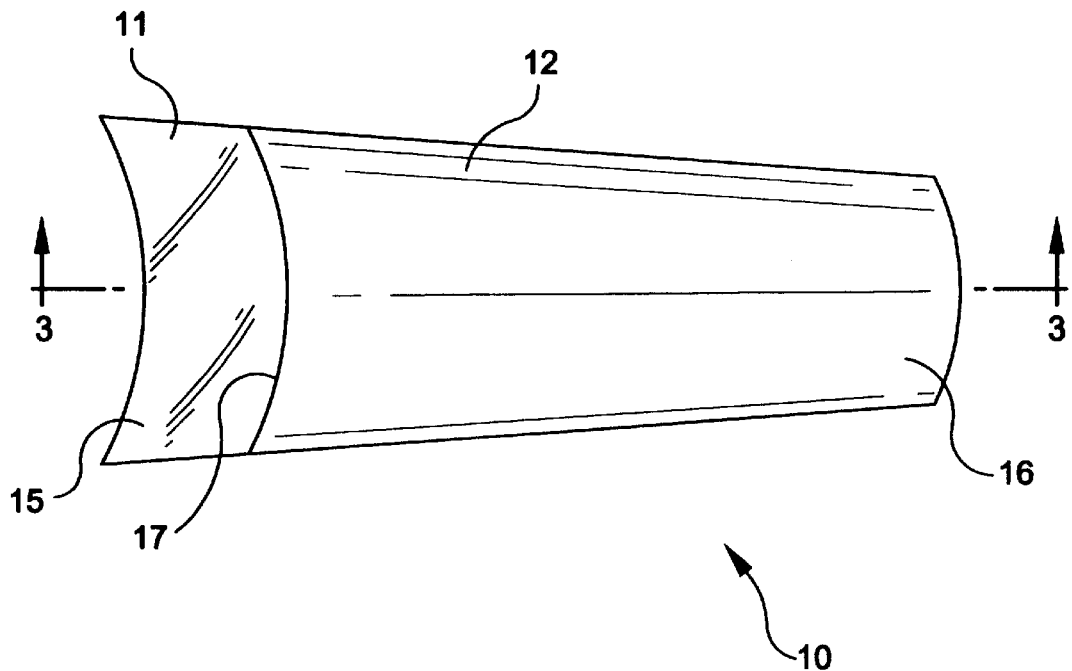
FIG. 2 is a top plan view of the inventive double top ornamental fingernail accessory in the form of a fingernail tip.
Figure 3:
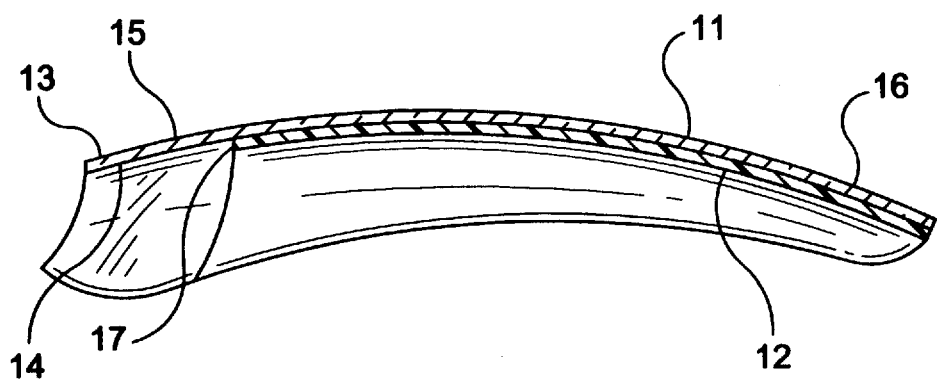
FIG. 3 is a cross sectional view of the fingernail tip accessory.

Referring to FIGS. 2 and 3, the overlay 11, has a top surface 13, a bottom surface 14, a first end (or proximal end) 15, and a second end (or distal end) 16. The first end 15 should be in the shape and size approximating the shape and size of at least the end of a fingernail of a wearer. In the case of a fingernail tip 10, the first end 15 of overlay 11 provides the shape and size of an adorned fingernail extension or tip. The overlay 11 is generally of uniform thickness but may decrease in thickness (i.e. taper) at the first end to facilitate attachment and blending with the natural fingernail.

The base 12 is generally disposed on the second end 16 of the overlay. In a preferred embodiment the base 12 is molded to the bottom surface 14 of the overlay Preferably, the shape of the base is substantially similar to that of the second end of the overlay. Thus, when molded to the overlay, the base is substantially coextensive with the second end of the overlay.

Preferably, the base also provides an abutment 17 on the bottom surface of the overlay defined by the thickness of the base and aligned with the transition between the first end 15 and the second end 16 of the overlay. The abutment is preferably crescent shaped to simulate the shape of the forward edge of a natural fingernail. Abutment 17 can also provide a means for fitting the accessory to the natural nail of the wearer.

Upon applying the tip, the first end 15 of the overlay is placed on top of the wearer's fingernail and the abutment 17 is drawn into contact with the outward end of the fingernail. Since the overlay is transparent or translucent (as discussed further below), the entire length of the wearer's natural nail bed, including that portion covered by the overlay, remains visible. The opaque base 12, now extending beyond the outward end of the natural fingernail, is similarly visible through the top surface of the overlay. The abutment 17 thus forms a visible sharp border or "smile line" between the natural nail bed and the base. This contrast is the desired cosmetic effect created by applying a French tip. However, unlike current French tips, since the "smile line" of the present invention is coincident with the outward edge of the natural fingernail, the display of the wearer's natural nail bed is maximized.

Furthermore, upon shaping of the tip to blend it with the natural fingernail, the sharp "smile line" of the present invention remains distinct since filing the tip's top surface merely removes transparent material of the overlay. With current state-of-the art French tips the "smile line" is defined by the end of the tip. This end is applied over the top of the natural fingernail and must be shaped to blend with the natural nail.

Thus, filing current French tips causes distortion of the sharp "smile line" since the "smile line" itself is being filed. This eliminates the desired cosmetic enhancement created by applying a French tip.

Figure 2A:
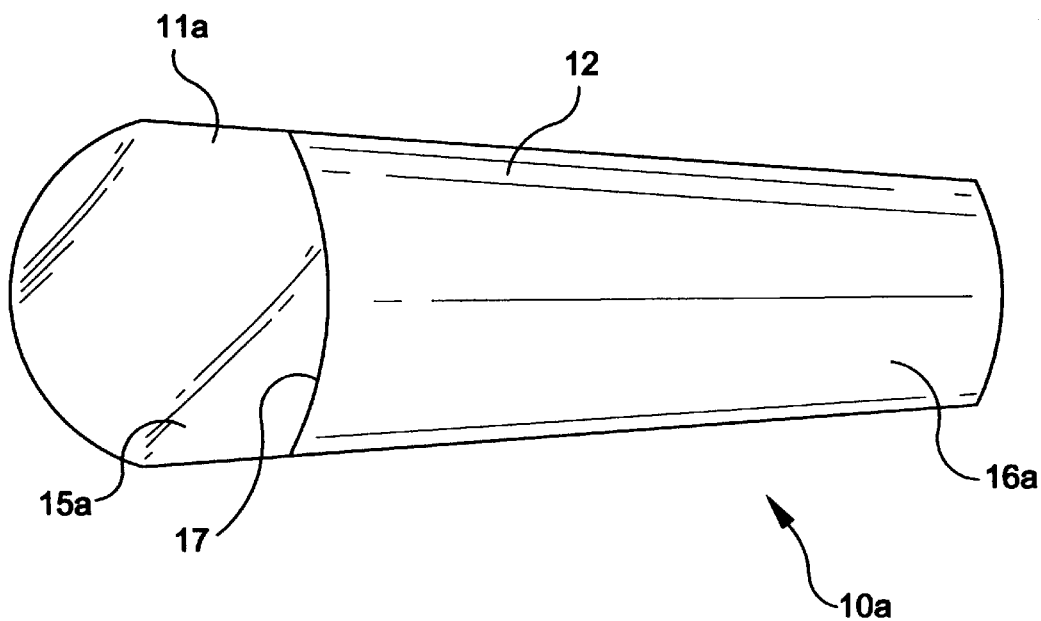
FIG. 2a is a top plan view of the inventive double top ornamental fingernail accessory in the form of a fingernail cover.
Figure 6:
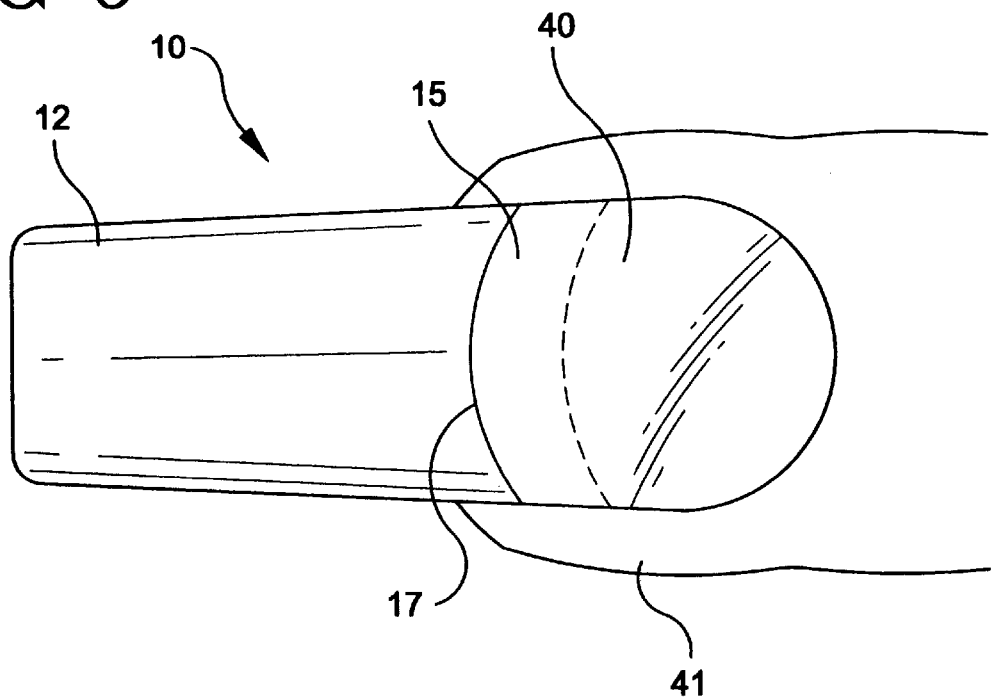
FIG. 6 is a top plan view of the fingernail accessory in the form of a fingernail tip affixed to the natural fingernail of the wearer.
Figure 6A:
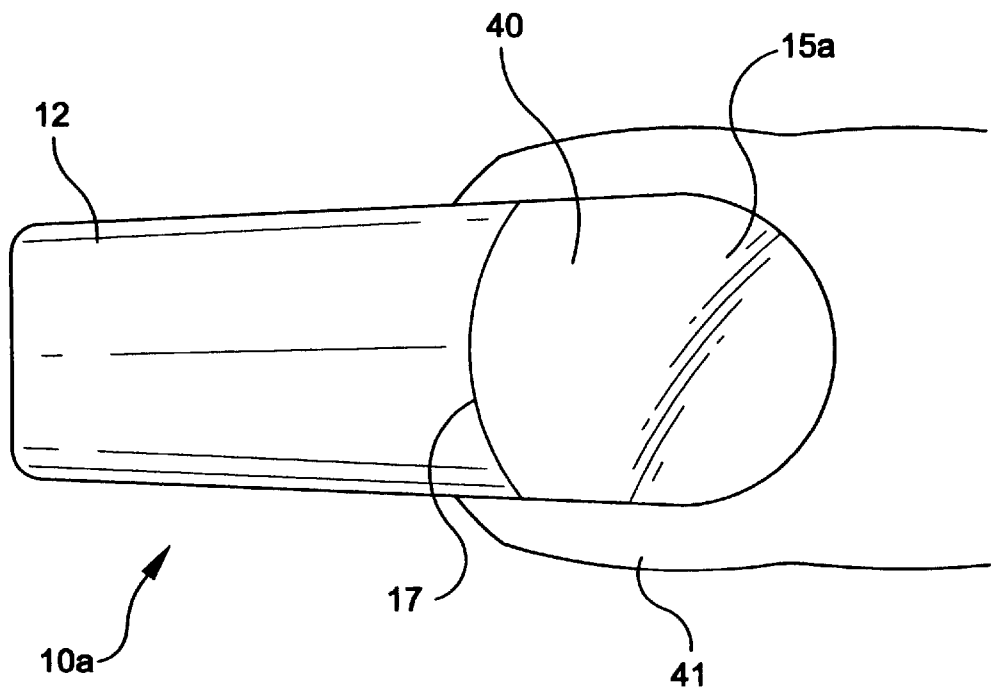
FIG. 6a is a top plan view of the fingernail accessory in the form of a fingernail cover affixed to the natural fingernail of the wearer.

In a second embodiment, the accessory may be a fingernail cover 10a which is applied over the entire top surface of the natural fingernail (see FIGS. 2a and 6a). In this embodiment, the accessory comprises an extended overlay 11a and a base 12. The extended overlay 11a is substantially similar to the overlay 11 of the tip 10 described above except that the overlay 11a has a first end (or proximal end) 15a in approximately the shape and size of a full natural fingernail. The base 12 is the same as set forth above and is similarly disposed on and substantially coextensive with a second end 16a of overlay 11a.

The overlay 11, 11a and base 12 are preferably made from a plastic like material commonly employed in the manufacture of artificial nails, (i.e., ABS plastic, nylon, tenite acetate, vinyl acetate, polycarbonates, etc.). In a preferred embodiment, the overlay and base are made from a mixture of ABS plastic and a polycarbonate, with a greater amount of ABS plastic than the polycarbonate. The overlay and base may be made of the same material or different materials, so long as the overlay is transparent or translucent relative to the base so that the base is visible through the top surface 13 of the overlay. For example, the overlay may be transparent and the base translucent, or the overlay may be translucent and the base opaque, etc. In a most preferred embodiment, the overlay is transparent and the base is opaque and white in color.

Figure 4:
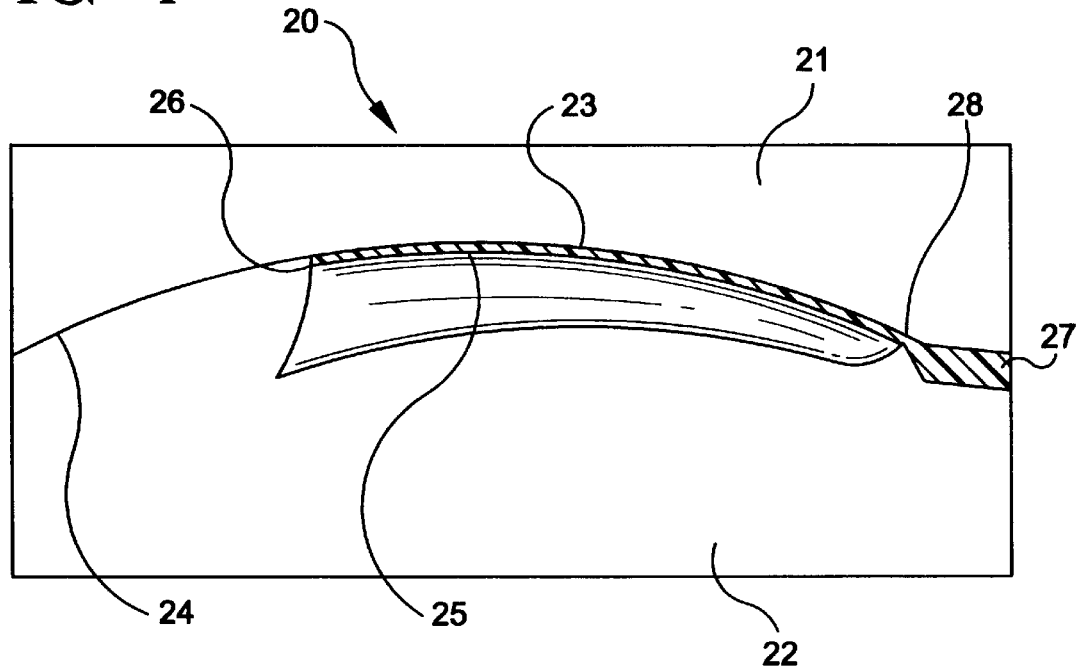
FIG. 4 is a cross sectional view of a mold used in a first injection step.
Figure 5:
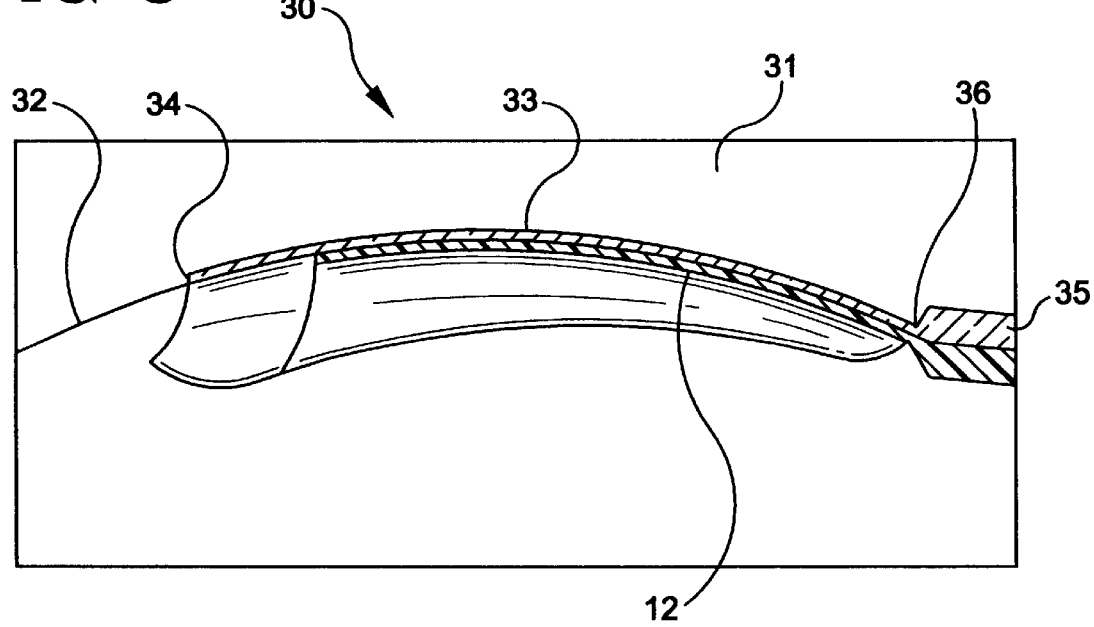
FIG. 5 is a cross sectional view of a mold used in a second injection step.

Referring to FIGS. 4 and 5, the accessory may be manufactured utilizing a two step molding process. In a preferred embodiment, the base 12 is first molded using conventional injection molding techniques known in the art. A mold 20, comprising a top half 21 and a bottom half 22, is utilized in this first step. The top half 21 includes an internal top surface 23 in substantially the same shape as the bottom surface of the overlay. The bottom half 22 includes an internal bottom surface 24 shaped inversely to the internal top surface 23 of the top half 21. The bottom half 22 also includes a lower recess 25 offset from the internal bottom surface 24 to provide the thickness of the base 12. The lower recess also includes a side wall 26 which defines the abutment 17 of the base 12. Liquid (molten) plastic material is injected into a lower mold port 27 and through a lower material gate 28, utilizing conventional injection molding techniques known in the art. The material flows to fill the lower recess 25 and thus form the base.

Once the base is sufficiently hardened (or cured), the top half 21 of the mold 20 is removed and replaced with a second top half 31 to form mold 30 (see FIG. 5). Notably, the molded base 12 remains in the bottom half 22 during the below described second injection step. The second top half 31 includes a second internal top surface 32 shaped to fit cooperatively (e.g., inversely) with the internal bottom surface 24 of bottom half 22. The second top half 31 also includes an upper recess 33 offset from the second internal top surface 32 to provide the thickness of the overlay 11, 11a. The upper recess 33 also includes a side wall 34 which defines the first end 15, 15a of the overlay 11, 11a. A second injection is then made into an upper mold port 35 and through an upper material gate 36. The material flows over the base 12 and fills the upper recess 33 to form the overlay 11, 11a. Thus, the overlay 11, 11a is molded directly to the base 12. In this second step, the overlay 11, 11a and base 12 are fused together but maintain their respective visible characteristics.

Referring now to the method of attaching the thus provided fingernail accessory (cover or tip) to the natural fingernail, a quick drying liquid adhesive is first applied to the bottom surface 14 of the overlay at its first end 15, 15a. Abutting contact is then effected between the abutment 17 and the forward edge of the natural fingernail. The first end 15, 15a of the overlay 11, 11a is then pressed firmly against the natural nail until secure. After the adhesive dries, the fingernail accessory is firmly bonded to the natural nail. Finally, the top surface of the overlay may be filed or buffed and clear nail polish may be applied.

Referring to FIGS. 6 and 6a, the fingernail accessory thus disclosed allows the natural color of the wearer's nail bed 40 to be visible through the transparent or translucent first end 15, 15a of the overlay. Similarly, the base 12, which acts to simulate the visual characteristics possessed by a natural fingernail as it extends beyond the fingertip 41, is readily visible through the transparent or translucent second end 16, 16a of the overlay. Thus, a sharp and distinct crescent shaped "smile line," defined by the abutment 17 of the base 12, is clearly apparent. This is achieved without having to additionally apply colored nail polish to the accessory's nail bed or nail tip area as is done in what is now commonly referred to as a "French Manicure." Furthermore, the sharp "smile line" formed by the base is not deteriorated upon filing or buffing of the top surface of the overlay. Finally, the wearer has the ability to lengthen the appearance of the natural nail bed by positioning the accessory further away from the cuticle end of the natural fingernail.

While there has been described what is presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. An ornamental accessory for a fingernail comprising:
   an elongated overlay having a top surface and a bottom surface and a first end and a second end, said first end having a shape and size approximating the shape and size of at least the end of a fingernail of a wearer for attachment thereto, and
   a base fixed to said bottom surface of said overlay, said base being substantially coextensive with said second end of said overlay, such that an end of said base forms an abutment, said abutment being substantially aligned with a transition between said first and second ends of said overlay for positioning said accessory with respect to a tip of a fingernail.

2. An ornamental accessory as set forth in claim 1, wherein said overlay and said base are made from a mixture of acrylonitrile-butadiene-styrene (ABS) plastic and a polycarbonate.

3. An ornamental accessory as set forth in claim 1, wherein said base is fused together with said overlay.

4. An ornamental accessory as set forth in claim 1, wherein said overlay is transparent.

5. An ornamental accessory as set forth in claim 4, wherein said base is translucent.

6. An ornamental accessory as set forth in claim 4, wherein said base is opaque.

7. An ornamental accessory as set forth in claim 1, wherein said overlay is translucent.

8. An ornamental accessory as set forth in claim 7, wherein said base is translucent.

9. An ornamental accessory as set forth in claim 7, wherein said base is opaque.

10. An ornamental accessory as set forth in claim 1, wherein said first end has a shape and size approximating the shape and size of the outer end of fingernail of a wearer.

11. An ornamental accessory as set forth in claim 10, wherein said overlay is transparent.

12. An ornamental accessory as set forth in claim 11, wherein said base is translucent.

13. An ornamental accessory as set forth in claim 11, wherein said base is opaque.

14. An ornamental accessory as set forth in claim 10, wherein said overlay is translucent.

15. An ornamental accessory as set forth in claim 14, wherein said base is translucent.

16. An ornamental accessory as set forth in claim 14, wherein said base is opaque.

17. An ornamental accessory as set forth in claim 1, wherein said first end has a shape and size approximating the shape and size of a full fingernail of a wearer.

18. A French tip accessory for a fingernail comprising:

an elongated overlay having a top surface and a bottom surface and a first end and a second end, said first end having a shape and size approximating the shape and size of at least the end of a fingernail of a wearer for attachment thereto, and a base fixed to said bottom surface of said overlay, said base being substantially coextensive with said second end of said overlay, such that an end of said base forms an abutment, said abutment being substantially aligned with a transition between said first and second ends of said overlay, and said overly being transparent and said base being opaque and white in color, and wherein said bottom surface of said first end may be affixed to a top surface of the fingernail of the wearer and wherein a tip of the fingernail may abut against said base, wherein maximum nail base is displayed after attachment of said accessory to said fingernail.

* * * * *